June 26, 1962 R. C. HUGHES 3,040,801
APPARATUS FOR FORMING MATS OF ORIENTED SLIVERS
Filed Dec. 1, 1959 3 Sheets-Sheet 1

INVENTOR
ROGER C. HUGHES
BY
Fetherstonhaugh & Co.
ATTORNEYS

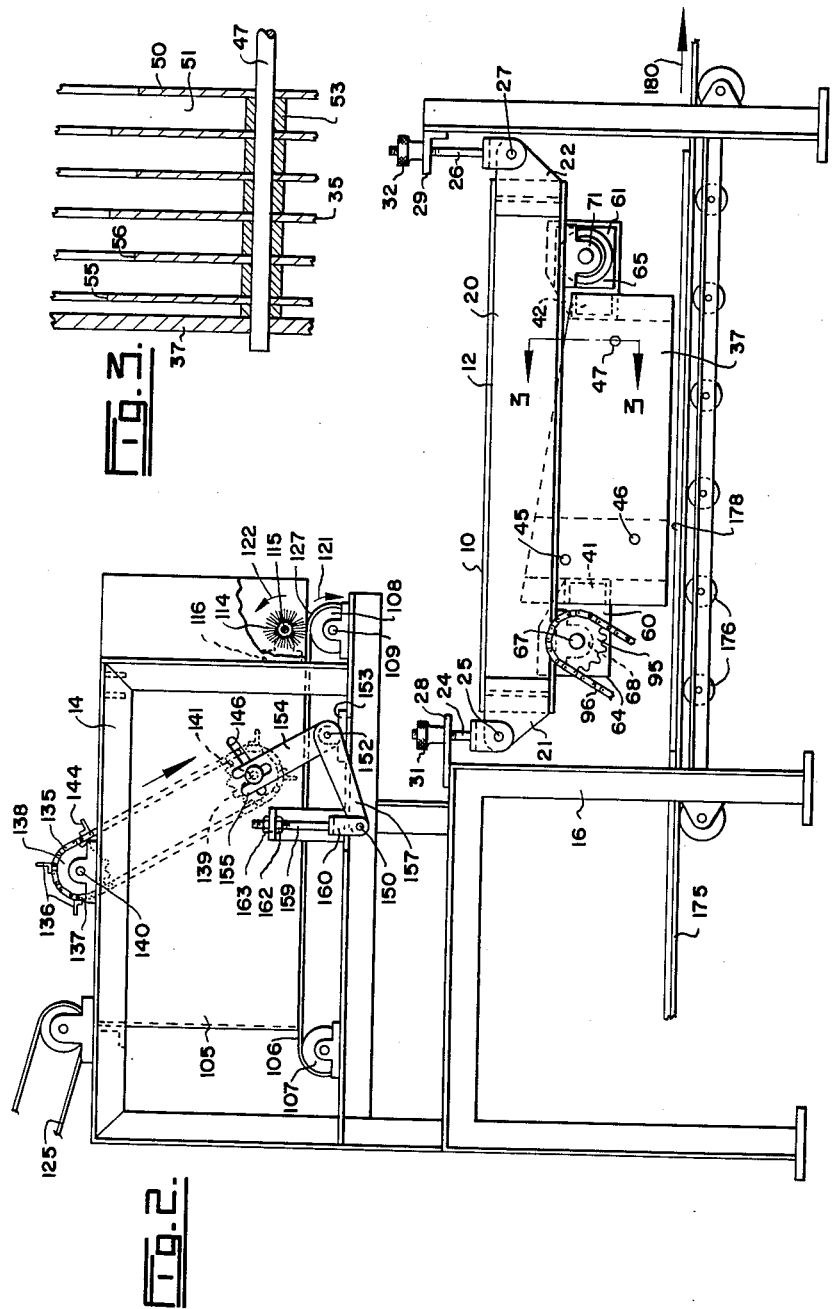

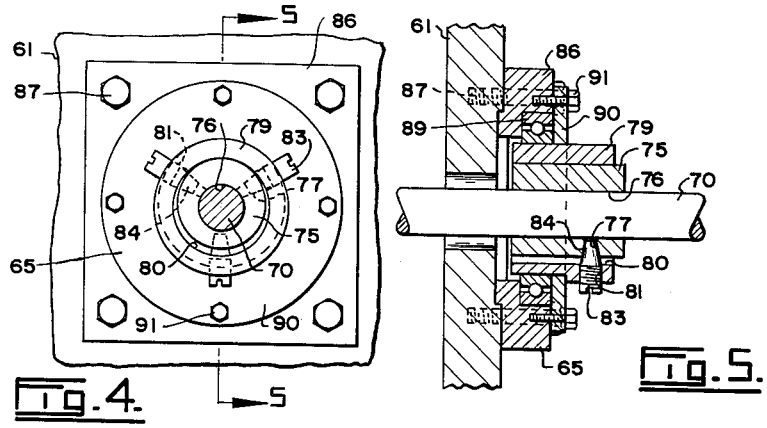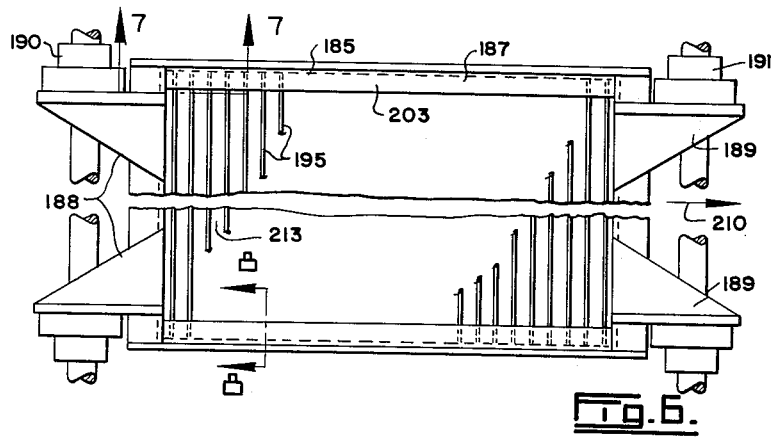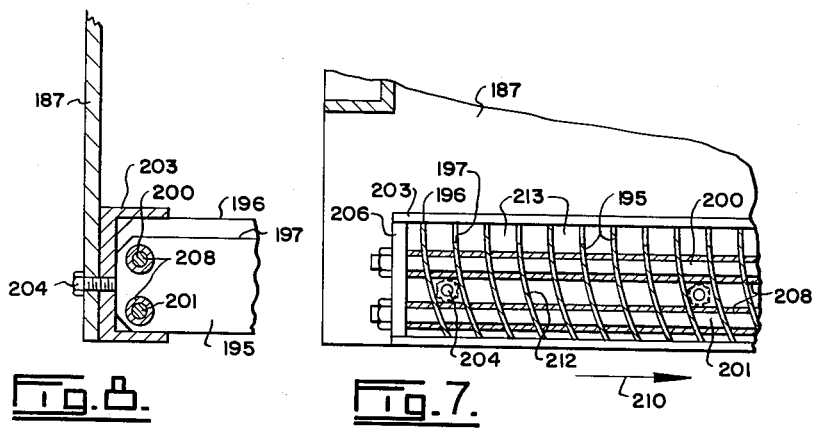

United States Patent Office 3,040,801
Patented June 26, 1962

3,040,801
APPARATUS FOR FORMING MATS OF
ORIENTED SLIVERS
Roger C. Hughes, Burnaby, British Columbia, Canada, assignor to MacMillan Bloedel and Powell River Limited, a corporation of Canada
Filed Dec. 1, 1959, Ser. No. 856,589
18 Claims. (Cl. 156—369)

This invention relates to apparatus for continuously orienting en masse long thin strands of wood or other material in parallel relationship to form mats of controlled thickness.

The term "strands" is intended to indicate pieces of wood or the like which are bundles of fibres. Each strand is relatively long and very thin and it is narrow as compared to its length. An example of a strand would be one that is 1¼ inches long, 13 thousandths inch thick and anywhere from ⅛ to ¼ inch wide.

Considerable effort has been expended in attempts to reduce the costs of the production of composite boards, and to utilize waste wood for this purpose. It is well-known that in the manufacturing of standard plywood, it is necessary to use only very large high-grade peeler logs. As a result of the previous work done, small and low grade logs and waste wood may be utilized in the production of composite boards. This is accomplished by breaking the wood down into comparatively long thin strands, and these strands are laid out in mats of desired dimensions and compressed into plies which may be substituted for plies utilized in the production of composite boards. It has been found that if the wood strands are oriented into parallel relationship to form mats of desired thicknesses, they may be compressed to produce laminae which are comparable in strength and other characteristics to wood veneers of corresponding thicknesses cut directly from the logs. The strands may be oriented in a direction extending longitudinally or transversely of the finished lamina.

Progress in this field has been held back because of the fact that it has been practically impossible to orient the wood strands by machine, so that this operation had to be done by hand. There have been two main difficulties:

(1) The wood strands, which are very light and comparatively fragile, have to be handled en masse, and this has resulted in the clogging up of the known machines that were tried for this purpose.

(2) The strands have to be oriented into mats of uniform thickness in order to produce laminae of desired thicknesses, and this has been impossible to accomplish in the prior machines.

The main object of the present invention is the provision of apparatus for forming mats of oriented strands which eliminates the difficulties pointed out above. This apparatus includes a grid arrangement which is such that large masses of strands of wood or other materials may be handled and oriented without danger of clogging. This apparatus also includes means for accurately controlling the flow of the strands so as to form mats of desired thicknesses.

Another object is the provision of apparatus of the nature described which may be used either to orient the wood strands into parallel relationship extending longitudinally of the mat or panel being formed, or to orient said strands into parallel relationship extending across the panel.

Apparatus according to the present invention includes a support carrying a grid which is made up of a plurality of substantially vertical and parallel plates on edge spaced apart a distance less than the length of the strands to be oriented. In the preferred form of the invention these plates have upper edges on to which wood strands are showered, and the upper edge of each alternate plate is higher than that of the next adjacent plate. Although not absolutely necessary, the apparatus preferably includes vibrating means connected to the grid for vibrating it to orient the strands fed to the upper edges of the plates into parallel relationship as said strands fall between the plates, and means below and near the grid substantially in a horizontal plane for receiving and maintaining the oriented strands in the parallel condition in a mat. The preferred form of the invention also has a hopper mounted above the grid for holding the wood strands, an endless belt forming the bottom of the hopper and extending beyond an end thereof over the grid near one of its ends, said belt having a discharge end over the grid. The hopper is provided with means for controlling the thickness of the layer of strands on the belt moving towards its discharge end, and an elongated rotary brush extends across said discharge end spaced a little above the belt. This brush is rotated so as to sweep strands off the belt and in a shower over the grid.

Examples of this invention are illustrated in the accompanying drawings, in which, FIGURE 1 is a plan view of apparatus for forming mats of oriented strands with the latter extending longitudinally of said mats, FIGURE 2 is a side elevation of this apparatus, FIGURE 3 is an enlarged sectional view taken on the line 3—3 of FIGURE 2.

FIGURE 4 is an enlarged sectional view taken on the line 4—4 of FIGURE 1,

FIGURE 5 is a section taken on the line 5—5 of FIGURE 4,

FIGURE 6 is a plan view of a grid for orienting the wood strands into parallel relationship extending transversely of the mat being formed, FIGURE 7 is an enlarged section taken on the line 7—7 of FIGURE 6, and FIGURE 8 is an enlarged section taken on the line 8—8 of FIGURE 6.

Figure 1:
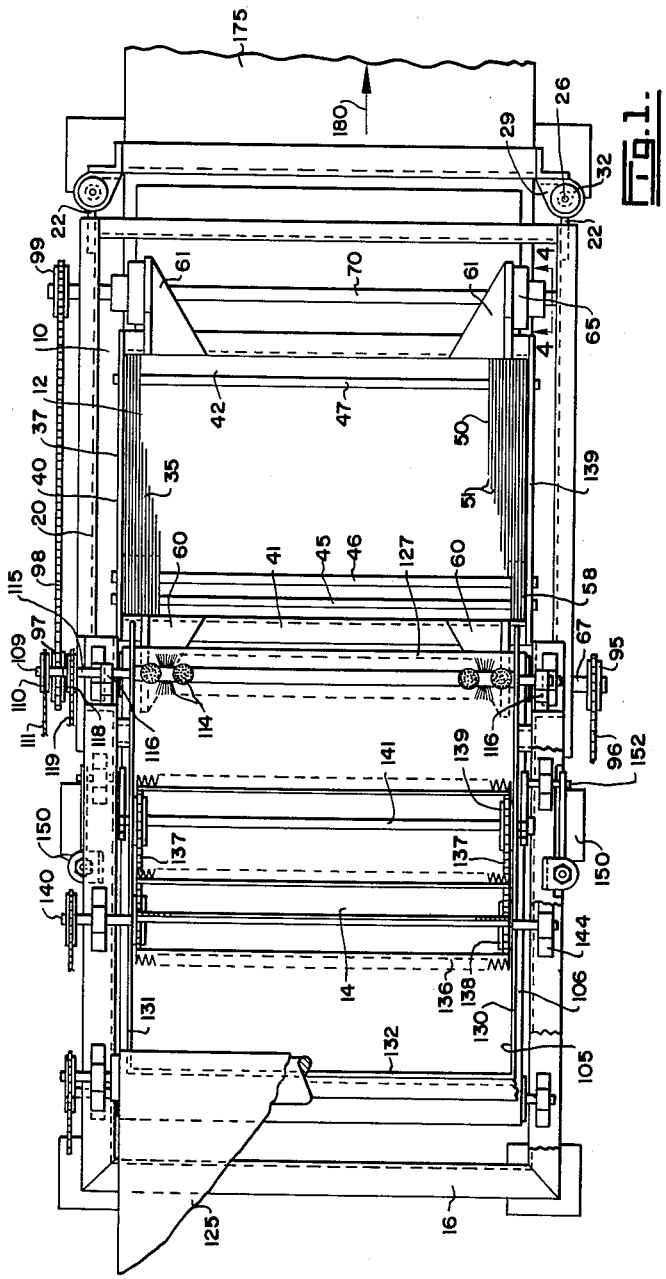

Referring to the drawings, 10 is apparatus for forming mats of oriented strands, and this apparatus consists of an orienting section 12 and a control feeding section 14. A suitable supporting structure 16 is provided, said structure carrying the sections 12 and 14. A rectangular open box 20 is suspended within the supporting structure. This box has lugs 21 and 22 projecting from opposite ends thereof, and threaded bolts 24 are hingedly connected to lugs 21 at 25 and project upwardly therefrom, while threaded bolts 26 are hingedly connected at 27 to lugs 22 and extend upwardly therefrom. Bolts 24 and 26 extend upwardly freely through brackets 28 and 29, respectively, carried by supporting structure 16 and have knurled nuts 31 and 32 threaded thereon. These nuts may be turned to adjust box 20 up and down in the supporting structure.

A grid 35 is carried by box 20. This grid is mounted within and supported by a hollow frame 37 having opposed sides 39 and 40 with opposed sides 41 and 42 extending between the ends thereof. The grid itself consists of upper and lower bars 45 and 46 extending between and carried by frame sides 39 and 40 near one end thereof, and another bar 47 carried by said sides near the opposite ends of the grid. A plurality of parallel plates 50 on edge are carried by the bars 45, 46 and 47 and are located to form narrow spaces 51 therebetween, see FIGURES 1 and 3. These plates are preferably arranged vertically, as shown, although they may be a little off the vertical, if so desired. These plates are fixed in position in any desired manner. For example, they may be welded to the bars 45, 46 and 47 which pass therethrough, or they may be spaced from each other and from the frames sides 39 and 40 by collars 53 on said bars between the plates, as clearly shown in FIGURE 3. In the preferred form of the invention, the upper edge 55 of each alternate plate is higher than the upper edge 56 of the next adjacent plate. Furthermore, it has been helpful to make the upper edges of all the grid plates to slope downwardly from one end to the other. In the illustrated example, the end 58 of grid 35 is considered the feed end thereof, and the upper edges of the grid plates are inclined downwardly therefrom.

Although the apparatus will function without vibrating means, in order to increase the output of a machine of a given size, it is desirable to provide suitable means for vibrating frame 37 and grid 35. By referring to FIGURES 1 and 2, it will be seen that the frame and grid are aligned with box 20 and are located at the open bottom thereof. The frame has brackets 60 projecting from side 41 thereof and brackets 61 projecting from the opposite side 42. Each of the brackets 60 carries an eccentric mounting 64, while each of the brackets 61 carries another eccentric mounting 65. A shaft 67 extends through aligned eccentric mountings 64 and is journalled in suitable bearings 68 depending from opposite sides of box 20. Similarly, a shaft 70 extends through eccentric mountings 65 and is journalled in suitable bearings 71 depending from said box sides.

As the eccentric mountings 64 and 65 are identical, only one will be described in detail, namely, mounting 65, and this is shown in detail in FIGURES 4 and 5.

Bearing mounting 65 includes a hub 75 having an eccentric bore 76 extending therethrough and through which shaft 70 rotatably extends. This hub has a plurality of tapered holes 77 therein located in a common plane. A bushing 79 has an eccentric bore 80 in which hub 75 rotatably fits. The bushing has a plurality of holes 81 located in the plane of the hub holes 77 and adapted to register therewith. A set screw 83 is threaded into each bushing hole 81 and has a tapered inner end 84 fitting in a hub hole 77. A housing 86 is secured to bracket 61 by means of bolts 87, and a bearing 89 is fitted between this housing and the outer surface of bushing 79, said bearing being held in position by a removable plate 90 which is secured to the housing by bolts 91.

The eccentric mounting 65 may be adjusted by removing set screws 83 and rotating hub 75 and bushing 79 relative to each other. When the set screws 83 are returned to their normal positions, the eccentric is fixed in the new setting. With this arrangement, the eccentric fittings 64 and 65 may be adjusted to regulate the vibration to which grid 35 is subjected.

Either or both shafts 67 and 70 may be driven. In this example, a sprocket 95 is fixedly mounted on an end of shaft 67 and is connected by a chain 96 to a source of power, not shown. Another sprocket 97 is fixedly mounted to the opposite end of shaft 67, see FIGURE 1, and is connected by a chain 98 to a sprocket 99 fixedly mounted on the end of shaft 70. Thus, rotation of shaft 67 causes shaft 72 to rotate, and grid 35 is vibrated by the eccentric mountings 64 and 65.

Control feeding section 14 is carried by supporting structure 16 above the orienting section 12 at the feed end 58 of grid 35. The feeding section includes a hopper 105 over and bearing against the top run of an endless belt 106 which forms the bottom of said hopper. This belt extends around rolls 107 and 108 located just beyond the ends of the hopper, and the portion of the belt running around the latter roll constitutes the discharge end of said belt. A shaft 109 extends outwardly from an end of roller 108 and has a sprocket 110 fixedly mounted thereon which is connected by a chain 111 to a suitable source of power, not shown. A cylindrical brush 114 is mounted on a shaft 115 extending through bearings 116 mounted for vertical adjustment on a portion of supporting frame 16. A sprocket 118 is fixedly mounted on shaft 115 and is driven by a chain 119 extending to a suitable source of power, not shown. The direction of movement and rotation of belt 106 and brush 116 are indicated by arrows 121 and 122 in FIGURE 2.

The wood strands are delivered to hopper 105 in any desired manner. They may, for example, be directed thereinto by an endless belt 125 which feeds into the hopper. The wood strands drop down on to the upper run of belt 106 and are moved along the bottom of the hopper to the discharge end 127 of the belt which is located outside the hopper.

The upper run of belt 106 may extend through a comparatively large opening in a wall of hopper 105 located immediately behind brush 114. However, it has been found preferable to omit a hopper wall at this point or, in other words, hopper 105 is formed with side walls 130 and 131, and end wall 132 remote from brush 114, while the opposite end of said hopper is open.

It is desirable to provide means for adjustably controlling the depth of wood strands on belt 106. This may be accomplished by means of an endless belt arrangement 135 consisting of toothed or comb-like flights 136 extending between chains 137 at opposite ends thereof, said chains extending around upper and lower sprockets 138 and 139 fixedly mounted on upper and lower shafts 140 and 141, respectively. Shaft 140 is journalled in suitable bearings 144 carried by the supporting structure 16, while shaft 141 extends through arcuate slots 146 formed in hopper sides 130 and 131, the centre of curvature of each of these slots coinciding with the axis of upper shaft 140.

It will be noted that the belt arrangement 135 is inclined in the hopper towards the discharge end 127 of belt 106. Movement of shaft 141 in the arcuate slot 146 adjusts the lower end of the belt arrangement vertically relative to the bottom belt 106. Suitable adjusting means 150 is provided at each end of shaft 141. As these are identical, the one shown in FIGURE 2 only will be described in detail. A horizontal stub shaft 152 is carried by a suitable bearing 153 mounted on the supporting structure 16 outside hopper 105. As upper arm 154 is fixedly mounted on this shaft, and has a bifurcated upper end 155 spanning the end of shaft 140. A lower arm 157 is also fixedly mounted on shaft 152 and extends substantially at right angles to upper arm 154. A vertical threaded bolt 159 is pivotally connected by a link 160 to the free end of arm 157, and extends upwardly through a bracket 162 which is fixedly mounted on structure 16. Nuts 163 threaded on the belt above and below the bracket adjustably connect said bolt to the latter. Movement of bolt 159 upwardly or downwardly swings upper arm 154 around the axle of shaft 152 to move shaft 141 along the arcuate slots 146 in the hopper sides. This adjusts the space between flights 136 as they move around the belt arrangement 135 relative to the bottom belt 106. This determines the depth of wood strands on belt 106 as it moves towards its discharge end 127. In other words, this regulates the feed of strands from hopper 105. As brush 114 is located just above the discharge end of the hopper bottom belt, this brush whisks the strands off the belt and showers them over grid 35 so that they land on the upper edges 55 and 56 of grid plate 50.

This apparatus is constructed so that it can handle wood strands of substantially the same size, or it may be adjusted to handle strands of different sizes. If the length of the strands is to be changed, it may be necessary to change the spacing of grid plates 50. If collars 53 are used, this may be done by changing the length of the collars and inserting more or less plates in the grid. If the plates are welded to bars 45, 46 and 47, it will be necessary to replace the grid structure. In any case, the plates 50 are spaced apart a distance less than the length of the strands to be oriented by the apparatus. For example, if the strands are approximately 1¼ inches long, the plates would be spaced apart approximately ⅜ inch. This allows for considerable variation in the length of the strands so that adjustment of the spacing of the grid plates is only necessary if there is a drastic change in the length of the strands.

The operation of the apparatus described so far is comparatively simple. The wood strands to be oriented are showered down on to the upper edges of the plates of grid 35. As will be realized, some of the strands will be properly aligned, and they will fall between plates 50, while other strands will tend to fall across the upper edges of said plates. This would result in a tendency to clog the apparatus but for the fact that the upper edges 55 of alternate plates are higher than the upper edges 56 of the adjacent plates. This means that no strand can assume a horizontal position, it is bound to be inclined downwardly if it rests on the upper edges of two plates so that it falls off said edges. If the grid is vibrated, the strands drop into the spaces between the plates more quickly than they otherwise would. Thus, the strands are oriented into parallel relationship.

Suitable means is provided below and near grid 35 substantially in a horizontal plane for receiving and maintaining the oriented strands in their parallel condition in a mat. One way of doing this is by a conveyor belt 175 which moves over rollers 176 carried by the supporting structure 16 immediately below grid 35. A plurality of plates or cauls 178 are moved by belt 175 beneath the grid at a predetermined speed. Each caul is preferably the size of the mat or lamina to be formed. For example, these may be four feet wide and eight feet long when the lamina are intended for producing standard sized panels. In this case, grid 35 is four feet wide, and the grid plates 50 extend in the direction of movement of the caul, indicated by arrow 180 in FIGURE 2. The speed of movement of the caul, the adjustment of belt arrangement 135 relative to the hopper bottom belt 106, and the speed of the latter belt determines the thickness of the mat of strands formed on each caul 178. These strands are oriented into parallel relationship extending longitudinally of the mat being formed.

In some cases, it is desirable to orient the wood strands across the mat being formed. FIGURES 6 to 8 illustrate a grid 185 for this purpose, which may be substituted for grid 35 in the apparatus described above. Grid 185 is made up of a hollow frame 187 having brackets 188 and 189 projecting from opposite ends thereof, and carrying eccentric arrangements 190 and 191 similar to the eccentric arrangements 64 and 65 described above. The grid itself consists of a plurality of substantially vertical and parallel plates 195 on edge spaced apart a distance less than the length of the strands to be oriented. The upper edge 196 of each alternate plate is higher than the upper edge 197 of the next adjacent plate.

The ends of plates 195 are mounted on upper and lower bars 200 and 201 extending longitudinally within channel brackets 203, said brackets being secured to the adjacent side frame 187 by bolts 204. The ends of brackets 203 are closed by plates 206, and bars 200 and 201 extend through these plates. The brackets 203 and the plates extending therebetween form a unit that may be removed from frame 187. Spacer sleeves 208 on these bars space the plates apart the desired distance.

Although plates 195 may be completely vertical, it has been found advantageous to curve each plate in the direction of movement of the caul 178, this being indicated by arrow 210 in FIGURES 6 and 7. In other words, each plate curves downwardly as indicated at 212 and to the right as viewed in FIGURE 7, so that when the wood strands pass through the spaces 213 between the plates, a lateral motion is imparted to them in the direction of movement of the cauls. This helps to keep the strands in their proper oriented position when they drop on to the cauls which are moving laterally with respect to the direction of the orientation.

When it is desired to form mats with the strands oriented across the width thereof, grid 185 is substituted for grid 35 in the apparatus. It will be noted, however, that the two grid structures are such that plates 195 with their end brackets 203 may be inserted into the frame 37 of grid 35. This would eliminate the necessity of an extra frame 187 with its brackets and eccentric mountings. In any case, the wood strands are showered down on to the upper edges of the grid plates 195. As these upper edges are staggered, the strands cannot remain thereon to cause clogging of the apparatus.

What I claim as my invention is:

1. Apparatus for continuously orienting en masse long thin strands of wood or the like in parallel relationship to form mats of controlled thickness, comprising a support, a grid carried by the support, said grid including a plurality of substantially vertical and parallel plates on edge spaced apart a distance less than the length of the strands to be oriented, said plates having upper edges on to which wood strands are showered and the upper edge of each alternate plate being higher than that of the next adjacent plate, said plates forming therebetween narrow unobstructed passages from said upper edges to lower edges thereof, said grid plates orienting the strands fed to the upper edges thereof into parallel relationship as said strands fall between the plates, and means immediately below and near the lower edges of the plates and substantially in a horizontal plane for receiving the oriented strands while still in the parallel condition in a mat.

2. Apparatus for continuously orienting en masse long thin strands of wood or the like in parallel relationship to form mats of controlled thickness, comprising a hollow frame, a grid mounted within and supported by the frame, said grid including a plurality of substantially vertical and parallel plates on edge spaced apart a distance less than the length of the strands to be oriented, said plates having upper edges on to which wood strands are showered and the upper edge of each alternate plate being higher than that of the next adjacent plate, said plates forming therebetween narrow unobstructed passages from said upper edges to lower edges thereof, eccentric means at and connected to opposite ends of the frame, means operatively connected to the eccentric means for vibrating the frame and the grid therein, said grid plates orienting the strands fed to the upper edges thereof into parallel relationship as said strands fall between the plates, and means immediately below and near the lower edges of the plates and substantially in a horizontal plane for receiving the oriented strands while still in the parallel condition in a mat, 3. Apparatus for continuously orienting en masse long thin strands of wood or the like in parallel relationship to form mats of controlled thickness, comprising a hollow frame having four sides, a plurality of bars extending between and connected to opposed sides of the frame, a plurality of substantially vertical and parallel plates on edge mounted on the bars and spaced apart a distance less than the length of the strands to be oriented, said plates forming a grid within the frame, said plates having upper edges on to which wood strands are showered and the upper edge of each alternate plate being higher than that of the next adjacent plate, said plates forming therebetween narrow unobstructed passages from said upper edges to lower edges thereof, vibrating means connected to the frame for vibrating said frame and the grid, said grid plates orienting the strands fed to the upper edges thereof into parallel relationship as said strands fall between the plates, and means immediately below and near the lower edges of the plates and substantially in a horizontal plane for receiving the oriented strands while still in the parallel condition in a mat.

4. Orienting apparatus as claimed in claim 3 in which the upper edges of the grid plates slope downwardly from one end to the other.

5. Apparatus for continuously orienting en masse long thin strands of wood or the like in parallel relationship to form mats of controlled thickness, comprising a support, a grid carried by the support, said grid including a plurality of substantially vertical and parallel plates on edge spaced apart a distance less than the length of the strands to be oriented, said plates having upper edges on to which wood strands are showered and the upper edge of each alternate plate being higher than that of the next adjacent plate, said plates forming therebetween narrow unobstructed passages from said upper edges to lower edges thereof, vibrating means connected to the grid for vibrating the latter, said grid plates orienting the strands fed to the upper edges thereof into parallel relationship as said strands fall between the plates, and a substantially horizontal conveyor immediately below and near the lower edges of the plates and along which cauls move to receive the oriented strands while still in parallel condition in mats of predetermined thickness, said cauls being large enough to underlie the entire grid.

6. Orienting apparatus as claimed in claim 5 in which the grid plates extend in the direction of movement of the cauls on the conveyor.

7. Orienting apparatus as claimed in claim 5 in which the grid plates extend across the direction of movement of the cauls in the conveyor.

8. Orienting apparatus as claimed in claim 7 in which each grid plate curves downwardly in the direction of movement of the cauls.

9. Apparatus for continuously orienting en masse long thin strands of wood or the like in parallel relationship to form mats of controlled thickness, comprising a support, a grid carried by the support, said grid including a plurality of substantially vertical and parallel plates on edge spaced apart a distance less than the length of the strands to be oriented, said plates having upper edges and forming therebetween narrow unobstructed passages from said upper edges to lower edges thereof, means above the grid for showering wood strands down on to the grid across the width thereof, vibrating means connected to the grid for vibrating the latter, said grid plates orienting the strands fed to the upper edges thereof into parallel relationship as said strands fall between the plates, and means immediately below and near the lower edges of the plates and substantially in a horizontal plane for receiving the oriented strands while still in the parallel condition in a mat.

10. Apparatus for continuously orienting en masse long thin strands of wood or the like in parallel relationship to form mats of controlled thickness, comprising a hollow frame, a grid mounted within and supported by the frame, said grid including a plurality of substantially vertical and parallel plates on edge spaced apart a distance less than the length of the strands to be oriented, said plates having upper edges and forming therebetween narrow unobstructed passages from said upper edges to lower edges thereof, means above the grid for showering wood strands down on to the grid across the width thereof, vibrating means connected to the grid for vibrating the latter, said grid plates orienting the strands fed to the upper edges thereof into parallel relationship as said strands fall between the plates, and means immediately below and near the lower edges of the plates and substantially in a horizontal plane for receiving the oriented strands while still in the parallel condition in a mat.

11. Apparatus for continuously orienting en masse long thin strands of wood or the like in parallel relationship to form mats of controlled thickness, comprising a hollow frame having four sides, a plurality of bars extending between and connected to opposed sides of the frame, a plurality of substantially vertical and parallel plates on edge mounted on the bars and spaced apart a distance less than the length of the strands to be oriented, said plates forming a grid within the frame, said plates having upper edges and forming therebetween narrow unobstructed passages from said upper edges to lower edges thereof, vibrating means connected to the frame for vibrating said frame and the grid, said grid plates orienting the strands fed to the upper edges thereof into parallel relationship as said strands fall between the plates, and means immediately below and near the lower edges of the plates and substantially in a horizontal plane for receiving the oriented strands while still in the parallel condition in a mat.

12. Apparatus for continuously orienting en masse long thin strands of wood or the like in parallel relationship to form mats of controlled thickness, comprising a support, a grid carried by the support, said grid including a plurality of substantially vertical and parallel plates on edge spaced apart a distance less than the length of the strands to be oriented, a hopper mounted above the grid for holding wood strands, an endless belt forming the bottom of the hopper and extending beyond an end of said hopper over the grid near one end thereof, said belt having a discharge end over the grid, means in the hopper near the discharge end of the belt for controlling the thickness of the layer of strands thereon moving towards its discharge end to be showered down on to the grid across the width thereof, vibrating means connected to the grid for vibrating the latter, said grid plates orienting the strands fed to the upper edges thereof into parallel relationship as said strands fall between the plates, and means below and near the grid substantially in a horizontal plane for receiving and maintaining the oriented strands in the parallel condition in a mat.

13. Apparatus for continuously orienting en masse long thin strands of wood or the like in parallel relationship to form mats of controlled thickness, comprising a support, a grid carried by the support, said grid including a plurality of substantially vertical and parallel plates on edge spaced apart a distance less than the length of the strands to be oriented, a hopper mounted above the grid for holding wood strands, an endless belt forming the bottom of the hopper and extending beyond an end of said hopper over the grid near one end thereof, said belt having a discharge end over the grid, means in the hopper near the discharge end of the belt for controlling the thickness of the layer of strands thereon moving towards its discharge end, an elongated rotary brush extending across the discharge end of the belt spaced a little above said belt, means connected to the brush to rotate it to sweep strands off the belt and in a shower over the grid, vibrating means connected to the grid for vibrating the latter, said grid plates orienting the strands fed to the upper edges thereof into parallel relationship as said strands fall between the plates, and means below and near the grid substantially in a horizontal plane for receiving and maintaining the oriented strands in the parallel condition in a mat.

14. Apparatus for continuously orienting en masse long thin strands of wood or the like in parallel relationship to form mats of controlled thickness, comprising a hollow frame having four sides, a plurality of bars extending between and connected to opposed sides of the frame, a plurality of substantially vertical and parallel plates on edge mounted on the bars and spaced apart a distance less than the length of the strands to be oriented, said plates forming a grid within the frame, a hopper mounted above the grid for holding wood strands, an endless belt forming the bottom of the hopper and extending beyond an end of said hopper over the grid near one end thereof, said belt having a discharge end over the grid, means in the hopper near the discharge end of the belt for controlling the thickness of the layer of strands thereon moving towards its discharge end to be showered down on to the grid across the width thereof, vibrating means connected to the frame for vibrating said frame and the grid, said grid plates orienting the strands fed to the upper edges thereof into parallel relationship as said strands fall between the plates, and means below and near the grid substantially in a horizontal plane for receiving and maintaining the oriented strands in the parallel condition in a mat.

15. Apparatus for continuously orienting en masse long thin strands of wood or the like in parallel relationship to form mats of controlled thickness, comprising a support, a grid carried by the support, said grid including a plurality of substantially vertical and parallel plates on edge spaced apart a distance less than the length of the strands to be oriented, a hopper mounted above the grid for holding wood strands, an endless belt forming the bottom of the hopper and extending beyond an end of said hopper over the grid near one end thereof, said belt having a discharge end over the grid, means in the hopper near the discharge end of the belt for controlling the thickness of the layer of strands thereon moving towards its discharge end to be showered down on to the grid across the width thereof, vibrating means connected to the grid for vibrating the latter, said grid plates orienting the strands fed to the upper edges thereof into parallel relationship as said strands fall between the plates, and a substantially horizontal conveyor below and near the grid along which cauls move to receive and maintain the oriented strands in parallel condition in mats of predetermined thickness, said cauls being large enough to underlie the entire grid.

16. Orienting apparatus as claimed in claim 15 in which the grid plates extend in the direction of movement of the cauls on the conveyor.

17. Orienting apparatus as claimed in claim 15 in which the grid plates extend across the direction of movement of the cauls in the conveyor.

18. Orienting apparatus as claimed in claim 17 in which each grid plate curves downwardly in the direction of movement of the cauls.

References Cited in the file of this patent

UNITED STATES PATENTS 2,825,454     Musgrave _____ Mar. 4, 1958